United States Patent
Encinias

[11] 3,832,794
[45] Sept. 3, 1974

[54] FISHING POLE HOLDER

[76] Inventor: Petro Antonio Encinias, 1124 21st St., Denver, Colo. 80205

[22] Filed: Mar. 9, 1973

[21] Appl. No.: 339,657

[52] U.S. Cl. .................................................. 43/15
[51] Int. Cl. ......................................... A01k 97/12
[58] Field of Search ....................................... 43/15

[56] References Cited
UNITED STATES PATENTS

| | | |
|---|---|---|
| 2,898,697 | 8/1959 | Housman ............................... 43/15 |
| 2,918,746 | 12/1959 | Hamrick ................................ 43/15 |
| 3,016,648 | 1/1962 | Ingersoll et al. ...................... 43/15 |
| 3,170,262 | 2/1965 | Hall ....................................... 43/15 |
| 3,284,943 | 11/1966 | Wedel .................................... 43/15 |
| 3,591,970 | 7/1971 | Davenport ............................. 43/15 |
| 3,660,921 | 5/1972 | McDonnell ............................. 43/15 |

Primary Examiner—Louis G. Mancene
Assistant Examiner—J. Q. Lever

[57] ABSTRACT

A device, intended primarily for use in fresh-water lake fishing, and incorporating features which will be contribute to the ease and convenience of those who fish for hobby and sporting reasons, is hereby enclosed.

The fishing pole holder, with the utilization of a mechanical action which is initiated by the movement of fish nibbling on the lure or bait on the line, allows the user to set the device with the pole in place, and to leave it unattended, the need to return occurring only when the release mechamism is triggered by a fish on the line, which results in the pole being snapped to a vertical position, thereby pulling the fish and line from the water.

4 Claims, 2 Drawing Figures

PATENTED SEP 3 1974          3,832,794

FISHING POLE HOLDER

BACKGROUND OF THE INVENTION

The development of the present invention was brought about as the result of an idea, i.e., a relatively fool-proof mechanical device which could be pre-set at a fishing site and actuated by a fish nibbling on the lure or bait.

OBJECTS OF THE PRESENT INVENTION

The major object of the present invention is the afore-mentioned feature of the mechanically activated movement of the socket and pole, which is set by the fisherman and initiated by the fish.

Another object of the device is to furnish the user with a degree of convenience, as he can set the device and leave it, thus creating the possibility of using two or more fishing pole holders at a fishing site, at the same time.

DETAILED DESCRIPTION

Figure 1:
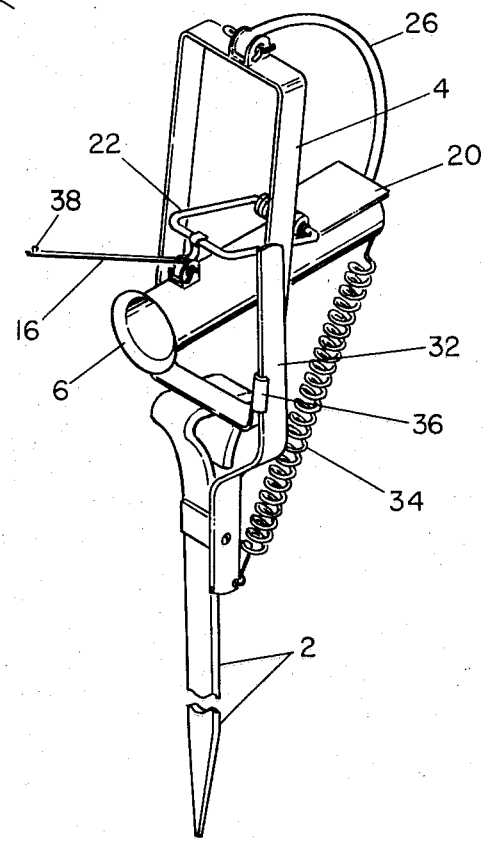
FIG. 1 is a three-dimensional drawing of the assembled fishing pole holder.

The device, as assembled and fabricated according to the concept and design of the present invention disclosure, is illustrated with its components shown in their respective conjunction to each other, and described as follows:

The device, as shown in FIG. 1, may be implanted in the ground by means of the stake (reference numeral 2), the upper end of which is affixed to the socket frame (reference numeral 4), by riveting or welded means, unless otherwise shown.

Figure 2:
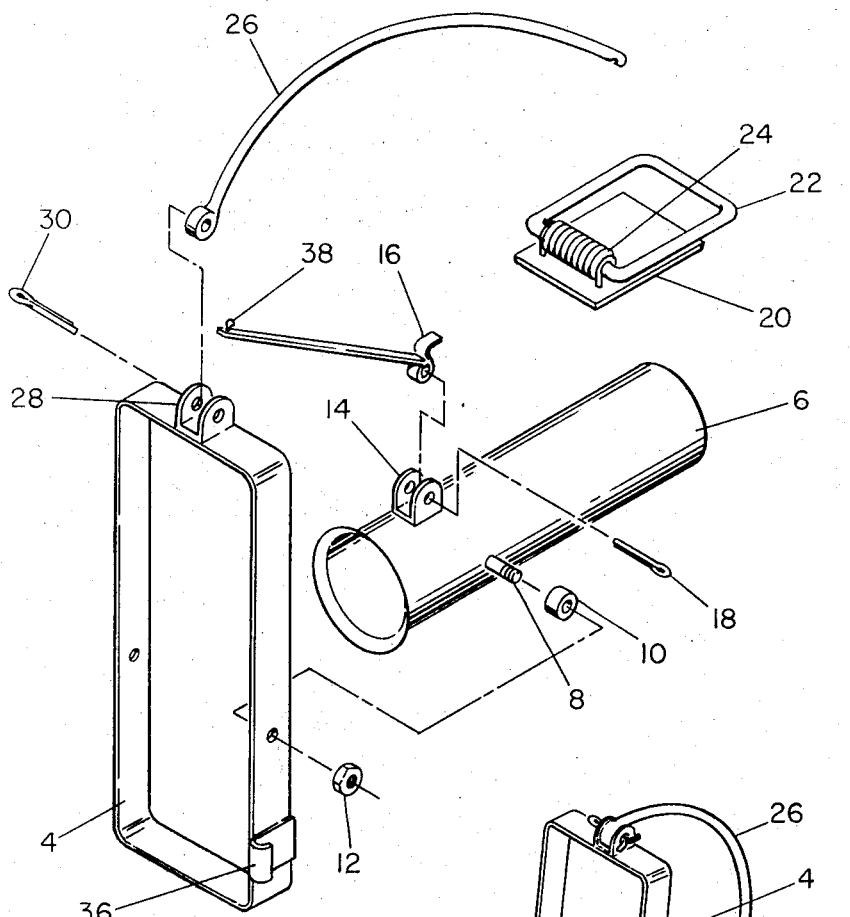
FIG. 2 is a three-dimensional partial view of the actuating mechanism.

As seen if FIG. 2, the socket frame supports the pole socket 6, which is pivoted on a threaded study 8 affixed to each side, with a spacer 10, and a nut 12. On the upper side of the pole socket 6 is attached the trigger base 14 which holds the trigger 16 with the cotter pin 18. The opposite end of the pole socket provides space for the striker base 20, to which is attached the striker 22 and spring 24. The latch pin 26, which is secured into the latch pin bracket being affixed to the top of the socket frame 4.

Returning to FIG. 1, the remaining components of the device are the cocking actuating spring 34 lever 32 which is attached to the stake 2, the actuating spring 34 which is connected to the lower end of the cocking lever 32, and to the rear end of the pole socket 6, and the cocking lever hook 36, which is affixed to the side of the socket frame 4.

The operating sequence for the systematic function of the device is as follows:

The pole socket 6 is held in the horizontal position and the striker 22 is lifted and rotated until it can be positioned under the hook of the trigger 16 as is shown in FIG. 1. The latch pin 26 is then hooked under the edge of the striker base 20, and the cocking lever 32 is rotated upward and secured in place by its hook 36, placing the actuating spring 34 under tension.

The device, with the fishing pole in place in the socket, is now ready for use, and as the trigger 16 is moved as a result of the fish tugging on the line, which runs thru the trigger eye 38, the striker 22 is released, contacting the latch pin 26 and allowing the socket to be propelled upward by the action of the release of the actuating spring 34.

What is claimed for the invention is:

1. A fishing pole holder intended to swing a fishing pole releasably held therein upon the application of an external force to a fishing line of the fishing pole, the fishing pole holder comprising: an elongated stake having one end adapted to be inserted into the ground with the opposite end projecting upwardly therefrom; a rectangular skeleton type socket frame having a horizontal top end, a horizontal bottom end, and opposed substantially parallel vertically extending side surfaces, the bottom end mounted on the projecting top end of the stake with the rectangular skeleton type socket frame projecting upwardly from the stake; and elongated hollow cylindrical pole socket member having an internal bore extending axially therethrough and adapted to receive the handle portion of a fishing pole thereinto; a pair of laterally spaced apart cylindrical studs projecting diametrically outwardly from diametrically opposed sidewalls of the socket, the studs being in axial spaced apart alignment; a pair of horizontally aligned apertures provided in the side surfaces of the socket frame adapted to pivotally receive therein the studs for mounting the pole socket thereto in a manner pivotable about the horizontal axis such that the pole socket may swing in a substantially vertical plane about such horizontal axis between a cocked unactivated position and an uncocked activated position; a latch pin having one end pivotally connected to the top end of the socket frame with the opposite end adapted to be releasably connected to the back end portion of the pole socket to hold the pole socket in the cocked position; a trigger mechanism mounted on the top surface of the pole socket and adapted to be actuated by an external force applied to the fishing line by a biting fish such that actuation of the trigger mechanism effects the release of the latch pin from the pole socket; and a actuating spring having one end connected to the back end portion of the pole socket with the opposite end adapted to be extended therefrom in a downward direction to place a tensioning force on the back end portion of the pole socket such that upon release of the latch pin the actuating spring effects the downward pivotal movement of the back end of the pole socket and the associated upward swinging movement of the pole socket front end whereby the fishing pole supported therein is swung in an upward direction upon a fish or the like applying an external force to the fishing line.

2. The fishing pole holder as set forth in claim 1 wherein the trigger mechanism comprises: a rectangular striker base secured in a substantially horizontal position on the top side wall surface of the pole socket when the pole socket is viewed in a horizontal position; a striker member having one end connected to the end of the striker base nearest the front end of the pole socket with the opposite end normally projecting rearwardly therefrom toward the pole socket back end; a spring operatively mounted on the forward end of the striker base and connected to the connected end of the striker member to effect a biasing force thereon continuously urging the striker member into the normal position pointed toward the pole socket back end; an elongated trigger member having one end pivotally connected to the pole socket side wall in a position generally horizontally aligned with the striker base for pivotal movement thereabout in a vertical plane; a hook member formed integrally with the trigger member at the pivotally connected end thereof and adapted to releasably retain therein the free end of the striker member when pivoted about its connected end in a manner tensioning the spring associated therewith; the free projecting end of the trigger having an aperture extending therethrough adapted to receive the fishing line freely therethrough; the trigger member when in the operative position extending at an incline forwardly and upwardly from the axis of the pole socket such that applying an external force to the end of the fishing line will effect the downward movement of the trigger member free end toward the axis of the pole socket thus releasing the striker member from the hook member to effect the pivotal movement of the striker member under the effect of the spring associated therewith, the free end of the striker member as it returns to its normal inoperative position pointing toward the pole socket rear end acting to disengage the latch pin from the pole socket permitting the actuating spring to effect the movement of the pole socket.

3. The fishing pole holder as set forth in claim 2 wherein the latch pin comprises an arcuately curved elongated member having a first end pivotally connected to the top end of the socket frame, the opposite end having a recess hook like formation formed therein adapted to releasably engage the rear end portion of the striker base when the pole socket is in the cocked position and adapted to release the striker base upon being moved outwardly therefrom by action of the free end of the striker member after its release from the trigger hook.

4. The fishing pole holder as set forth in claim 3 further comprising a cocking lever pivotally connected intermediate its end portions to the stake to define a handle member at one end and a lever arm at the opposite end, the end of the lever arm connected to the end of the actuating spring projecting outwardly from the pole socket, the cocking lever adapted for pivotal rotation about the pivot point between an inoperative position releasing the tension in the actuating spring and an operative position tensioning the actuating spring to retain the pole socket in the cocked position, and a cocking lever hook permanently affixed to the socket frame side surface nearest the cocking lever and adapted to releasably retain the handle member of the cocking lever in the operative spring tensioning position.

* * * * *